United States Patent Office 3,090,201
Patented May 21, 1963

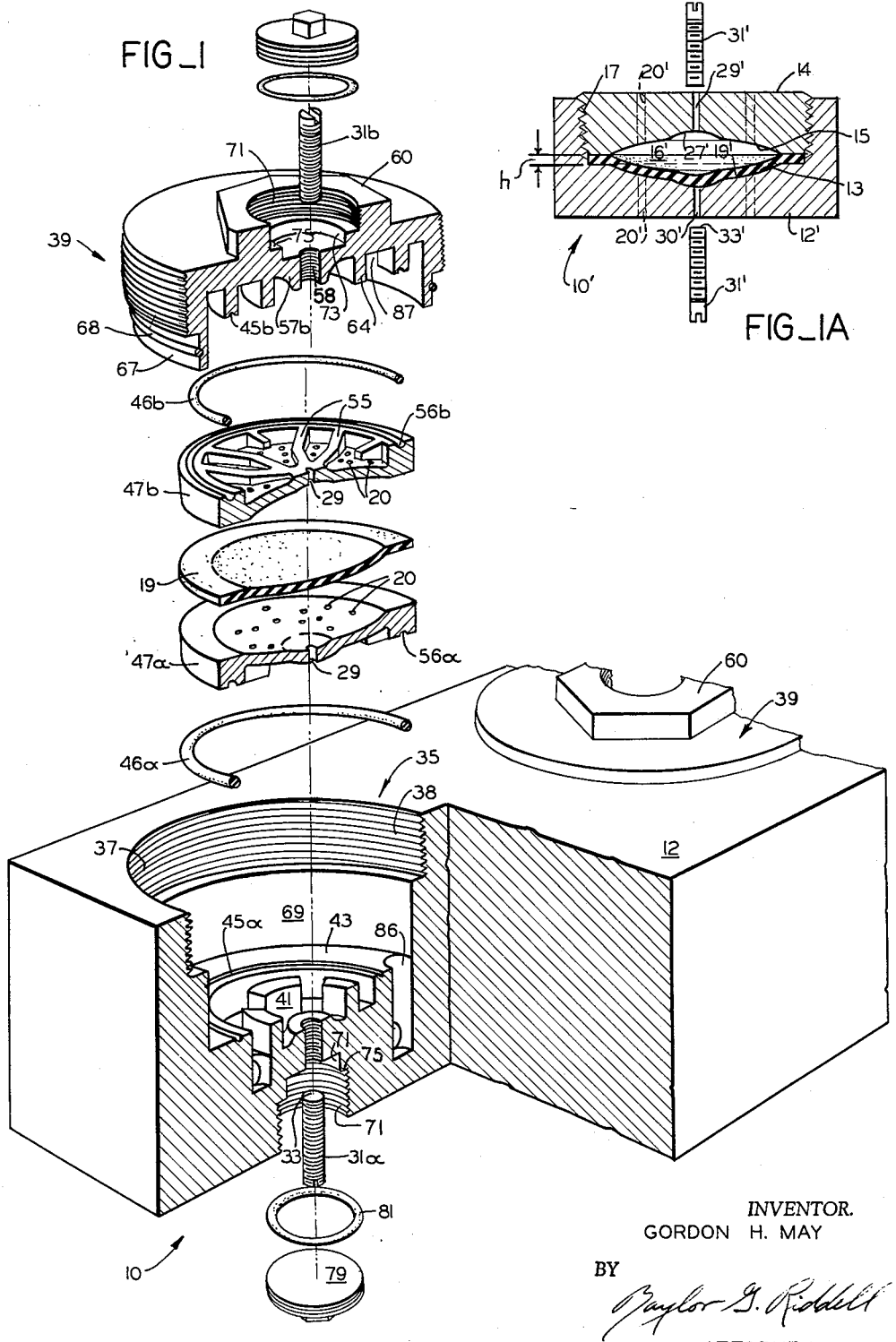

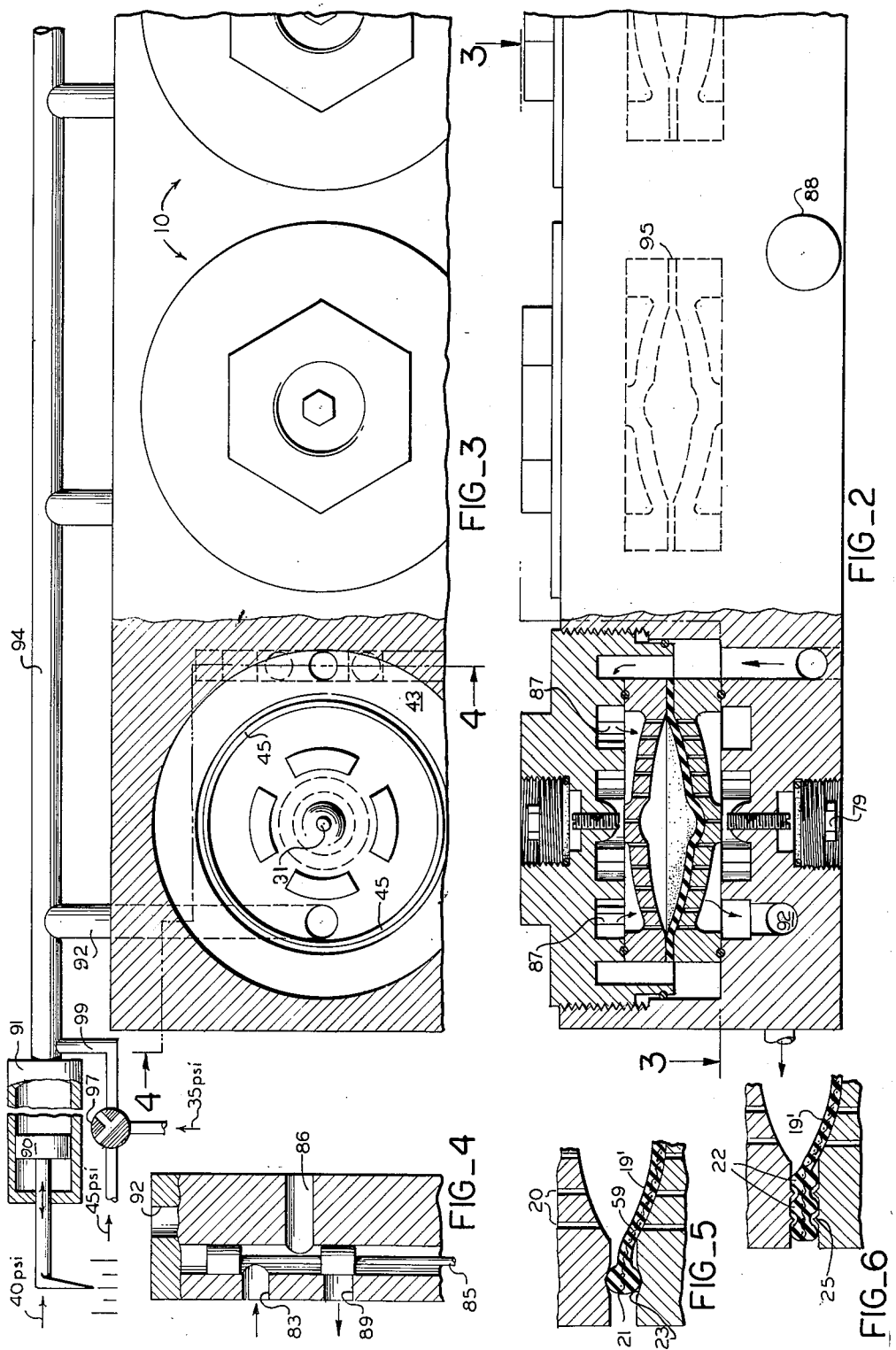

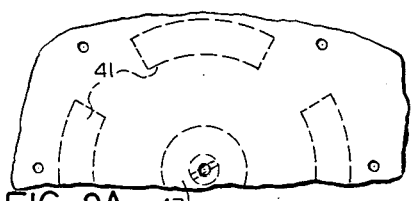
FIG_8A
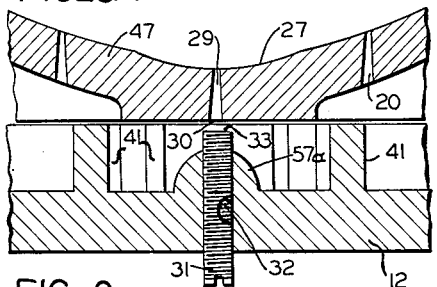
FIG_8
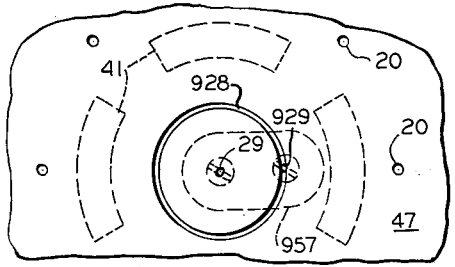
FIG_9A
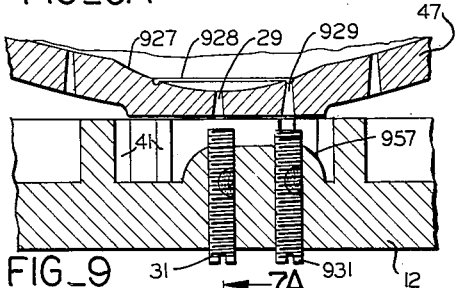
FIG_9
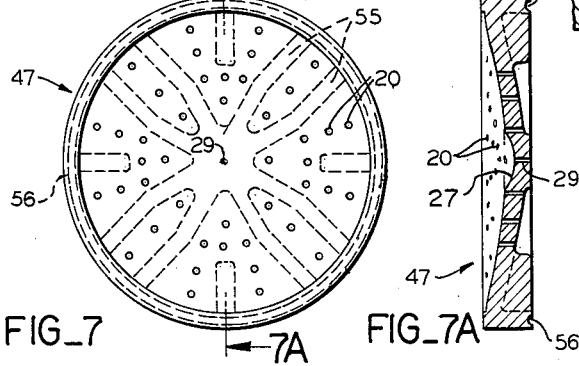
FIG_7  FIG_7A
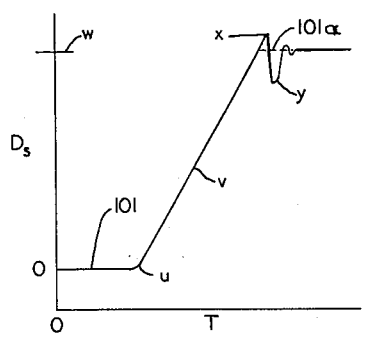
FIG_8B
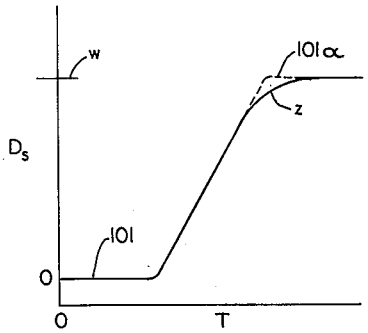
FIG_9B
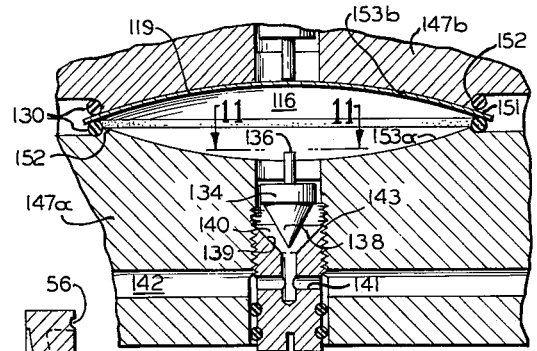
FIG_10
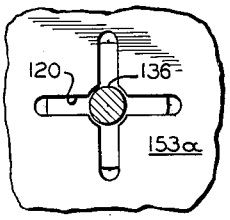
FIG_11

3,090,201
FLUID DISPLACEMENT DEVICE
Gordon H. May, San Jose, Calif., assignor to International Business Machines Corporation, New York, N.Y., a corporation of New York
Filed Dec. 29, 1958, Ser. No. 783,387
15 Claims. (Cl. 60—54.5)

This invention relates to a device for displacing a discrete volume of fluid and more particularly to such a device wherein the discrete volume of fluid displaced can be adjusted to a precise amount, to be utilized, for example, in adjusting the actuation of a driven or slave piston to move it to a precise location. Furthermore, the means for adjusting the volume of fluid also functions to produce a controlled rate of flow from the fluid enclosure.

In the prior art of fluid displacement devices as they are used to position a slave piston coupled hydraulically thereto, one such device employs an actuator pison arranged to move between fixed stops within a cylinder. The volume defined by its stroke multiplied by its area, determines the position to which the slave piston will be driven. Since any error in actuator diameter or stroke will usually be amplified and reflected in the positioning of the slave piston, the actuator piston and cylinder must necessarily be very accurately machined, particularly in those applications requiring the slave piston to be driven to a very precise location. Further, if a number of these carefully manufactured units were arranged to combine their fluid volumes to position the slave piston in accordance with selected combinations thereof, i.e., in the nature of a hydraulic "adder," it will be readily appreciated that errors in machining each individual actuator unit become cumulative and hence impose an even higher degree of manufacturing care with a correspondingly greater expense.

According to this invention, a resilient diaphragm is arranged between two opposed concave members forming the halves of a fluid chamber, one half being in fluid communication with a slave piston while the other half is connected to a source of fluid under pressure for displacing the diaphragm. The two opposed concave surfaces of the chamber halves define the limits of diaphragm displacement within the chamber while the resilience of the diaphragm permits the chamber halves to be adjusted with respect to each other. To drive the slave piston, the diaphragm is pressurized from one side thereby moving it to the opposite wall. This diaphragm displacement moves the fluid on the other side of the diaphragm out of the chamber and into the slave cylinder. If the slave piston travels beyond its desired destination, or falls short, simply adjusting the spacing between chamber halves will quickly and easily provide the correct diaphragm displacement output to enable the unit to place the slave piston at precisely its exact location.

Therefore, it is an object of this invention to provide an improved fluid displacement device and more particularly a fluid displacement actuator having an adjustable metered volumetric displacement.

It is another object of the invention to provide a hydraulic adder having adjustable displacement units.

Moreover by employing a diaphragm to produce a fluid displacement actuator in the above manner, the chamber may be readily adapted to provide a damped slave piston movement as well. This is achieved by providing the larger concave surface itself with a small concave surface, or shallow cup. Like the larger concave surface, this cup is also hydraulically connected to the slave piston but via a single restrictive orifice. Thus, as the diaphragm is displaced, it first reaches the larger concave surface of the wall toward which it is displaced, thereby driving the slave piston most of the desired distance. As the diaphragm continues its travel on into the cup, the fluid exhausts at a slower rate from the cup portion via the orifice thereby decelerating the slave piston. The diaphragm arrangement also permits damping to be achieved by the simple expedient of rateably distributing fewer holes in each chamber half progressively inwardly toward the center of the large concave surface.

Therefore, it is another object of the invention to provide a fluid displacement positioning device including means for controlling the rate of fluid flow from the displacement chamber.

It is a more particular object to provide a fluid displacing device including means for damping the movement of a driven object by progressively restricting the fluid channel from the chamber as the displacement actuator nears the end of its travel.

In the invention, where the single restrictive orifice and cup are used for damping, the orifice may be controllably varied in size to permit a very fine adjustment therein to be made. This feature makes it possible for the operator to "tune out" all bouncing or "hunting" movements at either or both ends of the slave piston stroke. Therefore, where variations in the driven load produce variations in the damping requirements, they will be easily reconciled by a simple adjustment. More elaborate control of the slave piston stroke may be provided by additional independently adjustable restrictive orifices suitably placed.

Thus, it is still another object of the invention to provide a damped stroke actuator wherein the damping is readily adjustable to accommodate changes in load requirements.

Notwithstanding the expense attendant the prior art actuator described above, in some rather elaborate applications where the demands for extremely accurate precision positioning of a slave piston have had to be met, the device above has nevertheless been used due to its inherent speed, force and accuracy. For example, some electronic computer applications incorporate a mechanical positioning step which tends to impose something of a speed limitation on the overall system which otherwise operates at electronic speeds. To illustrate such a mechanical step, a magnetic transducer may be required to be driven to a given magnetic information track on a rotating disc wherein adjacent tracks are spaced at intervals of .025" and wherein the total number of tracks are distributed over a relatively large distance such as nine to ten inches. Such an arrangement obviously demands both a critical placement accuracy for the transducer as well as an unusually fast transducer movement between one track and any other track located, possibly, ten inches away in order that information may be read or recorded among the various tracks without appreciably slowing down the overall computer function. Thus, notwithstanding the added expense of making a hydraulic positioning device within critical tolerances, it may be desirable, due to offsetting advantages of high acceleration, speed, accuracy, etc. to employ such an expensive device in those applications as described above where it will represent only a small proportion of the total cost of the overall application. Due to the very nature of the present invention, however, the same degree of positioning speed and accuracy is achieved without sacrificing a single advantage of the above device while using an inexpensive, simplified structure comprised substantially entirely of low-cost castings or their equivalent, thereby virtually eliminating all need for the more expensive machining work to be done.

Therefore, it is another object of this invention to provide an inexpensive and simplified fluid displacement device capable of displacing or metering an extremely precise volume of fluid.

Further, it will be appreciated that wear, in the above described prior art device, can destroy its usefulness through loss of accuracy thereby necessitating replacement of either the precision-made actuator piston, its cylinder, or both. Accordingly, the arrangement of the present invention permits all parts to be quickly, easily and inexpensively replaced.

Therefore, it is yet another object of this invention to provide a simplified fluid displacement unit having inexpensive and easily replaceable parts.

Another problem encountered in the prior art device and traceable to the close fit of the actuator piston within its cylinder, is that foreign and corrosive substances in the fluid have had to be filtered out in order to prevent the piston from sticking. In the present invention where the diaphragm has isolated the driving pressure side from the slave piston side no such filtering is required. In fact, two different fluids can even be used, for example, one (such as air) for actuating the diaphragm and another (such as oil) for hydraulically coupling the slave piston to the diaphragm chamber.

Therefore, another object of this invention is to provide a fluid displacement device which eliminates the need for filtering the actuator fluid.

Other objects of the invention will be pointed out in the following description and claims and illustrated in the accompanying drawings which disclose, by way of example, the principle of the invention and the best mode which has been contemplated of applying that principle.

In the drawings:

FIG. 1 is an exploded perspective sectional view of a fluid displacement unit in accordance with the invention.

FIG. 1A is a simplified arrangement schematically depicting the structure shown in FIG. 1.

FIG. 2 is a front elevation in partial section of the invention shown in FIG. 1 in its assembled condition.

FIG. 3 is a plan view of the invention taken along the line 3—3 of FIG. 2.

FIG. 4 is a sectional view of the invention taken along the line 4—4 of FIG. 3.

FIGS. 5 and 6 show means for achieving greater volumetric adjustments in the invention.

FIGS. 7 and 7A are a plan and sectional side elevation respectively of a cavity member of the invention.

FIG. 8 is an enlarged sectional view of the "tunable" damping orifice portion of FIG. 2.

FIG. 8A is a partial plan view of FIG. 8.

FIG. 8B is a graphical representation of the damping function achieved using the structure shown in FIG. 8.

FIGS. 9 and 9A are views similar to FIGS. 8 and 8A respectively showing an alternative embodiment of the "tuning" damping orifice of the invention.

FIG. 9B is a graphical representation of the function of the structure of FIG. 9.

FIGS. 10 and 11 represent a sectional elevation and partial plan view, respectively, of an alternative embodiment of the invention employing a metal diaphragm, FIG. 11 being taken along line 11–11 of FIG. 10.

Referring to the drawings and particularly to the schematic arrangement shown in FIG. 1A, wherein some reference numerals bear a prime mark (′) in order to maintain a suitable correlation between FIG. 1A and the actual structure depicted in the other drawings, a fluid displacement unit 10′ is shown comprising a first or block member 12′ having a concave cavity 13 therein. A closure member 14 having a similar concave cavity 15 is disposed in face to face adjustable spaced relation with respect to cavity 13 so as to form a fluid chamber 16′ therebetween. Cavity 13 is arranged to be adjusted with respect to cavity 15 by means of threads 17 formed in members 12′ and 14. A flexible resilient diaphragm 19′ made of a suitable material such as rubber is interposed between members 12′ and 14 so that it can flex between the surface of cavities 13 and 15. Members 12′ and 14 are each provided with a number of fluid channels or holes 20′ for passing fluid either into or out of chamber 16′. Therefore, as shown, pressurizing the top of diaphragm 19′ will displace it downwardly against the surface of cavity 13 thereby exhausting a predetermined column of fluid from chamber 16′. This fluid volume can be easily adjusted to an exact amount by merely screwing closure member 14 into or out of block 12′, the resilience of diaphragm 19′ permitting these adjustments to be made while maintaining a seal between the upper and lower portions of chamber 16′.

Although the degree of adjustment shown may at first appear to be insubstantial it should be readily appreciated that where, for example, a one inch diameter diaphragm is employed to drive a one-half inch diameter slave piston coupled hydraulically to chamber 16′, changes in the spaced relation between cavities 13 and 15 will be amplified four times and reflected in the positioning of the slave piston in accordance with the following algebraic formula wherein:

$r$ is the radius of diaphragm 19′

$h$ is the distance which members 13 and 15 are spaced apart $R$ is the radius of a slave piston hydraulically coupled to diaphragm 19′

$H$ is the stroke or displacement of the slave piston:

$$\pi r^2 h = \pi R^2 H$$
$$(0.5'')^2 h = (0.25'')^2 H$$
$$h = \tfrac{1}{4} H$$

Thus, a 0.1″ adjustment in the spaced relation between members 12′ and 14 will remedy a positioning error of 0.4″ appearing in the slave piston stroke. If greater adjustments in the spaced relation are expected to be necessary they may be achieved by suitable means such as by molding diaphragm 19′ with a single raised circular ring 21 around its circumference as shown in FIG. 5, or by a plurality of raised portions 22 (FIG. 6) which would provide a better sealing and gripping characteristic around the periphery of diaphragm 19′. In these latter cases it may be necessary to provide either a groove 23 or ridge 25 in members 12′ and 14 to firmly hold diaphragm 19′ therebetween.

Still referring to FIG. 1A it can be seen that each of the concave surfaces of cavities 13 and 15 have been provided with a shallow cup 27′. Cups 27′, as shown, are each provided with a single exhaust orifice 29′ which is adjustably controlled by a screw 31′ having a flat end surface 33′ disposed opposite the outer opening 30′ of orifices 29′. Thus, as diaphragm 19′ is pressurized downwardly toward cavity 13 most of the fluid in chamber 16′ in front of diaphragm 19′ will be exhausted via holes 20′. However, during the last stage of the downward movement of diaphragm 19′ a small portion of fluid will be trapped in cup 27′ and its rate of flow will be controlled by the spacing of surface 33′ with respect to opening 30′.

The structure and operation of the foregoing schematic arrangement of FIG. 1A has been substantially carried over into the actual structure shown and described in the balance of the figures. In the drawings the invention, as shown, comprises a block 12 having a plurality of displacement units 10 therein. Each unit 10 includes a well designated generally by arrow 35, the top wall portion 37 of which is threaded to receive threads 38 of a cap assembly 39. In the bottom of well 35 are located four support pillars 41 and a flat shoulder portion 43 level with the ends of pillars 41. In the following description, reference numerals have been provided with suffixes "a" or "b" where similar parts are employed in the structure in both a lower and upper location respectively. Portion 43 is formed with a concentric circular groove 45a therein for receiving an O ring 46a. Resting upon O ring 46a is a lower cavity member 47a.

Cavity member 47a is best shown by referring to FIGS. 7 and 7A. As there shown it includes a number of small holes 20 arranged to pass fluid freely through member 47. In selecting the number and size of holes 20 it has usually been preferred to make each hole sufficiently small so as to prevent extrusion of diaphragm 19 thereinto. On the other hand, there ought normally to be enough holes 20 so as to prevent cavity member 47 from becoming "flow limited," i.e., the fluid passage provided by all holes 20 taken together should be such that fluid passes freely from one side of member 47 to the other. Still referring to FIG. 7, member 47 is provided with a circular shallow cup 27 therein which provides damping as will be explained more fully below. In the center of cup 27 is a single hole which will be referred to herein as a tuning orifice 29 for controlling damping. Member 47 is further provided with a plurality of radial strengthening members 55, and finally, member 47 is provided with a circular concentric groove 56 for receiving an O ring 46. Thus, O ring 46a serves to align the lower cavity member 47a with respect to shoulder portion 43. This alignment places orifice 29 substantially over the center of a lower threaded boss 57a, best shown in FIGS. 8 and 8A. A flat ended damping set screw 31 is located in boss 57a and adjustable with respect to the outer opening 30 of orifice 29 to vary the rate of flow therethrough. Screw 31 is provided with a circular plastic insert 32 which locks screw 31 in position by providing an outward pressure against the threads 58 of boss 57.

A flexible resilient diaphragm 19 made of a suitable material such as rubber or plastic and preferably reinforced with a strong intermediate cloth layer 59 is provided immediately above the concave surface of member 47a and arranged to extend outwardly to the periphery thereof so as to form a seal between member 47a and an upper cavity member 47b which is identical thereto.

When O ring 46a resets in groove 45a, members 47a, 47b and diaphragm 19 therebetween are maintained aligned and compressed by cap assembly 39 screwed down into well 35. An O ring 46b is also provided for alignment between grooves 56b and 45b, the latter being formed in the outer circle of support pillars 64 provided in assembly 39. Cap assembly 39 is formed with a substantially smooth sleeve portion 67 extending downwardly therefrom. Sleeve portion 67 carries an O ring 68 secured therearound so as to form a seal between sleeve 67 and its coacting smooth wall 69 in well 35. Cap assembly 39 is also provided with a boss 57b having an adjustable set screw 31b therein as described with respect to boss 57a, as well as an adjusting nut 60.

In order to prevent tampering with screws 31 after their proper spaced relation with respect to orifices 29 has been established, there has been provided in the bottom of block 12 and in the top of cap assembly 39 a threaded outer recess 71 and a smooth-walled inner recess 73 of lesser diameter which forms a shoulder 75 therebetween. A plug 79 and an oil seal 81 are provided so that plugs 79 can be screwed tightly into recess 71 to compress seal 81 against shoulder 75.

Referring particularly to FIGS. 2, 3 and 4, which are arranged orthographically with respect to each other to show a unit 10 in its assembled condition, it will be seen that a fluid pressure inlet 83, controlled by a three-way spool valve 85, is provided leading to a vertical hole 86 drilled downwardly into block 12 from shoulder portion 43. This channel passes fluid freely between hole 86 and the upper side of diaphragm 19 via the gaps 87 between pillars 64 and holes 20 in upper cavity member 47b. The fluid pressure condition of hole 86 is controlled by valve 85 which is actuated by a solenoid 88. The spools of valve 85 are arranged to control inlet 83 or an exhaust port 89.

The lower side of diaphragm 19 is fluid connected to a slave piston 90 positionable within a cylinder 91 via porting 92 which leads to a manifold 94 common to all units 10.

Other units 10 within block 12 are provided with cavity members having larger or smaller concave surfaces therein as desired. In FIG. 2 this has been shown by invisible lines 95. Thus, if one unit 10 displaces one volumetric increment, a second unit 10 might, if desired, displace two volumetric increments, and a third unit 10 might displace four volumetric increments, so that by combining the displacements of the diaphragms 19 within selected combinations of the three units 10, slave piston 90 can be driven 1, 2, 3, 4, 5, 6, or 7 corresponding discrete positions (volumetric increments). In order to add or subtract fluid from the expansible hydraulic coupling defined between slave piston 90 and the lower side of diaphragm 19, a valve 97 (schematically shown) has been provided to connect manifold 94 via piping 99 to one of two sources of fluid under pressure (not shown) or neither, dependent upon its rotational orientation.

*Operation of the Adjustment Function*

For purposes of illustrating an example of the procedure followed in establishing an exact metered volumetric displacement of diaphragm 19 which will produce a desired slave piston stroke, the following pressures will be used although it is to be understood that these pressures represent only a matter of choice for purposes of illustration:

80 p.s.i. at inlet 83
0 p.s.i. at port 89
40 p.s.i. bias pressure acting on the left face of piston 90
35 p.s.i. or 45 p.s.i. available at replenishment valve 97

Starting with diaphragm 19 in its upper position, valve 85 conditioned to open port 89, and valve 97 maintained closed, piston 90 will be located at its home or "zero" position defining the start of its stroke. By actuating valve 85 to open inlet 83 while closing port 89, piston 90 will be driven to the left against the bias pressure acting thereon a distance determined by the amount of fluid displaced by diaphragm 19. For purposes of example it will be assumed that the driven distance of piston 90 is less than desired. Therefore, valve 97 must be temporarily conditioned to admit fluid at 45 p.s.i. into cylinder 91 via piping 99 until piston 90 has traveled leftward to its desired stroke distance. Valve 97 will then again be closed and port 89 opened. This will return diaphragm 19 upwardly until it reaches the concave surface of member 47b. However, since additional fluid has been added to the hydraulic coupling 100 via valve 97, piston 90 is prevented from returning to its "zero" or original starting location. Therefore, cap assembly 39 must be unscrewed upwardly by means of nut 60 until the bias pressure acting on slave piston 90 moves it back to its "zero" position. Subsequent actuation of diaphragm 19 will therefore impart the desired stroke to piston 90. Where piston 90 is initially driven beyond its desired stroke distance, similar adjustments can be made by conditioning valve 97 to the 35 p.s.i. source rather than the 45 p.s.i. source.

*Operation of the Damping Function*

Referring to FIG. 8B, a graph 101 is there shown wherein displacement of piston 90 is represented by the vertical axis $D_s$ and plotted against time represented by the horizontal axis T. Point "$u$" on graph 101 represents the approximate time when inlet 83 is opened by valve 85 so as to actuate piston 90. The straight line portion "$v$" of graph 101 represents the attainment of full speed by piston 90. With an improper damping adjustment, a certain amount of bouncing will occur at the end of the stroke of piston 90. This is represented in FIG. 8B, where point "$w$" is established as the desired stroke of piston 90, by showing points "$x$" and "$y$" respectively beyond and short of point "$w$." By means of screw 31 (FIG. 8) the spaced relation between opening 30 of tuning orifice 29 and surface 33 may be reduced to eliminate points "$x$" and "$y$"

from graph 101 thereby providing a controlled damping of piston 90 as shown by the dotted line 101a in FIGS. 8B and 9B.

More elaborate damping control may be achieved in the invention by the structure shown in FIGS. 9 and 9A wherein an additional independently adjustable screw 931 has been provided in a boss 957. A damping cup 927, somewhat larger than the cup 27 is provided having a circular trough 928 therearound leading to the additional tuning orifice 929 as controlled by screw 931. Thus, as diaphragm 19 enters cup 927, trough 928 will collect and exhaust fluid therefrom until it has been closed by diaphragm 19 leaving only orifice 29 for the final stage of damping. The function of this structure is represented by the solid line portion "z" on graph 101 of FIG. 9B and, as is readily apparent therefrom, an earlier and more gradual deceleration of piston 90 is effected.

From the foregoing it is to be understood that damping of the slave piston movements may also be effected by ratably distributing fewer holes in members 47 radially inwardly toward the center thereof. In such an arrangement cups 27 and 927 would not be required since diaphragm 19 would close off holes 20 progressively commencing at the periphery of member 47, the center hole being the last to close.

Although holes 20 have been described as not being "flow limited" it is to be understood that this condition is preferred only to provide a more rapid acceleration of piston 90 as shown by the steep angle of graph portion "v" which otherwise would be at a lesser angle with respect to the T axis. The graph portion 101a which shows a piston stroke wherein all bouncing has been eliminated was achieved in practice with a five pound load secured to the shaft of piston 90, the load being driven 9.5 inches in 180 milliseconds.

In order to minimize fatigue in diaphragm 19 and to further improve its highly accelerated "snap-action," it may be desirable to mold it with a permanent "set" or residual curvature conforming substantially to the concave surfaces of members 47. Further, it is to be understood that the use of two opposed concave surfaces is preferred because it provides diaphragm 19 with a longer stroke and extended life. However, it would not depart from the invention to substitute for one of members 47 a flat disc having holes 20 therethrough.

Referring to FIGS. 10 and 11, another embodiment of the invention is there shown using a flexible steel diaphragm 119 rather than the resilient diaphragm 19 described above. As there shown, the metal diaphragm embodiment includes a pair of opposed cavity members 147a and 147b. Members 147 are held spaced apart by a pair of resilient O rings 130, one on top of the other which, taken together, form a circumferential fulcrum 151 for the flexing of diaphragm 119. Rings 130 are each held in place by a lip 152 around the circumference of the concave surface 153 of each member 147. As thus arranged, diaphragm 119 is free to flex between the opposed surfaces 153 of members 147.

Inasmuch as both members 147a and 147b are the same, only member 147a has been shown described in detail. In the center of surface 153a, a spoke-shaped hole 120, best shown in FIG. 11, is provided for passing fluid to and from chamber 116 formed by surfaces 153. A floating needle valve 134 having a stem portion 136 integral therewith which extends through the center of hole 120 is arranged with respect to an adjustable screw 131 so as to control damping of the fluid flow through hole 120. Valve 134 is provided with a lower conical portion 138 which is arranged to enter a counter-sunk end cavity 139 of a screw 131. However, the slope of portion 138 is greater with respect to the horizontal than that of cavity 139 so as to form a converging gap 140 therebetween in order that the downward flow of fluid between portion 138 and cavity 139 will maintain valve 134 in a raised position. Screw 131 is further provided with a transverse hole 141 therethrough for permitting fluid to either escape from or enter cavity 116 from a suitable channel 142. Threads 143 are provided in member 147 as well as in screw 131 to permit gap 141 to be varied so as to control damping. Suitable O ring seals have been provided around screw 131 to prevent leakage.

In operation, as diaphragm 119 is driven downwardly fluid in chamber 116 is exhausted therefrom via holes 120, gap 140, hole 141 and through channel 142. The converging slopes of portion 138 and 139 effectively maintain valve 134 in a raised position. As diaphragm 119 nears the end of its stroke, pin 136 will be depressed by diaphragm 119 thereby reducing gap 140 to provide a reduced fluid flow in channel 142. The amount of this reduction in fluid flow may be increased or decreased as desired by suitably adjusting screw 131.

While there have been shown and described and pointed out the fundamental novel features of the invention as applied to the preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A fluid actuator comprising an expansible fluid coupling containing a noncompressible fluid, a flexible diaphragm and a movable member defining two boundaries of said coupling, said diaphragm being arranged to be displaced between a first and second limit to transmit motion of said diaphragm through said fluid to said member to move said member a predetermined distance, said limits defining the stroke of said diaphragm, and means for gradually changing the rate of diaphragm displacement during a portion of said stroke to damp the movement of said member.

2. A fluid actuator comprising an expansible fluid coupling containing a noncompressible fluid, a flexible diaphragm and a movable member defining two boundaries of said coupling, said diaphragm being arranged to be displaced between a first and second limit to transmit motion of said diaphragm through said fluid to said member to move said member a predetermined distance, said limits defining the stroke of said diaphragm, means for gradually changing the rate of diaphragm displacement during a final portion of said stroke to damp the movement of said member, and means for adjusting said limits to regulate said distance.

3. A fluid actuator comprising an expansible fluid coupling containing a noncompressible fluid, a flexible diaphragm and a movable member defining two boundaries of said coupling, said diaphragm being arranged to be displaced between a first and second limit to transmit motion of said diaphragm through said fluid to said member to move said member a predetermined distance, said limits defining the stroke of said diaphragm, and means for gradually decelerating said diaphragm displacement during a final portion of said stroke, said decelerating means including means for adjusting the rate of said deceleration to provide controlled damping of the movement of said movable member.

4. A fluid actuator comprising an expansible fluid coupling containing a noncompressible fluid, a flexible diaphragm and a movable member defining the end boundaries of said coupling, said diaphragm being arranged to be displaced between a first and second limit to transmit motion of said diaphragm through said fluid to said member to move said member a predetermined distance, means for adjusting said limits to regulate said distance, said limits defining the stroke of said diaphragm, and means operatively associated with said diaphragm and said fluid for gradually decelerating said diaphragm displacement during the final portion of said stroke, said decelerating means including means for varying the degree of said deceleration to provide controlled damping of the movement of said movable member.

5. A fluid actuator comprising an expansible fluid coupling containing a noncompressible fluid, a flexible diaphragm and a movable member defining boundaries of said coupling, a first and second diaphragm displacement limiting member, said diaphragm being arranged to be displaced between said first and second limiting members to transmit motion of said diaphragm through said fluid to said movable member to move said movable member a predetermined distance, means for adjusting said limiting members to regulate said distance, and fluid passage means for gradually decelerating said diaphragm during the terminal portion of a displacement thereof to damp the movement of said member, said fluid passage means including means for adjusting the rate of fluid flow through said fluid passage means to provide control of said damped movement.

6. A fluid actuator comprising an expansible fluid coupling containing a noncompressible fluid, a flexible diaphragm and a slave piston defining the ends of said coupling, a first and second cavity member disposed in opposed adjustable spaced relation to each other to limit the disphragm displacement therebetween, said diaphragm being arranged to be displaced between said first and second members to transmit motion of said diaphragm through said fluid to said piston to move said piston a predetermined distance in accordance with adjustments in said spaced relation, and fluid passage means formed in said cavity members and spaced to gradually decelerate said diaphragm during a terminal portion of a displacement thereof, said fluid passage means including a fluid exhaust channel having an adjustable restriction therein to regulate the rate of said deceleration.

7. A fluid displacement unit for driving a slave piston within a cylinder comprising a first member having a cavity therein, a second member disposed in face-to-face adjustable spaced relation with respect to said first member and covering said cavity to form an adjustable volume fluid chamber therebetween, a substantially impervious flexible resilient diaphragm interposed between said members to permit adjustments in said spaced relation thereby modifying the volume of said chamber, said diaphragm being arranged to separate said chamber into two portions isolated from each other and to flex between two extremes defined by the inner walls of said chamber, a closed column of fluid coupling one said chamber portion to said slave piston and means for flexing said diaphragm to displace the fluid of said column from said chamber to drive said piston a distance determined by said chamber volume, whereby said distance may be controlled by adjustments in said spaced relation.

8. The invention as defined in claim 7 further including an adjustable restriction in said column to regulate the rate of fluid displacement from the coupled chamber portion.

9. A fluid displacement unit for driving a slave piston within a cylinder comprising a first member having a first concave surface formed therein, a second concave surface formed in said first concave surface, a second member disposed in face to face adjustable spaced relation with respect to said first member and covering said surface to form an adjustable volume fluid chamber therebetween, a substantially impervious flexible resilient diaphragm interposed between said members to permit adjustments in said spaced relation modifying the volume of said chamber, said diaphragm being arranged to separate said chamber into two portions and disposed to flex between two extremes defined by the inner walls of said chamber, a closed column of noncompressible fluid coupling one said portion to said slave piston, said column including a plurality of fluid channels leading from said second concave surface, each of said channels being provided with independently adjustable restrictions therein to regulate the rate of fluid flow from that part of said chamber defined by said second concave surface, and means for flexing said diaphragm to displace the fluid of said column from said chamber to drive said piston a distance determined by the volume of said chamber, said fluid being displaced in successive stages as said diaphragm flexes successively to said first and second surfaces whereby the rate of piston movement during the last of said stages is controlled by adjustments in said restrictions.

10. In a volume adder wherein a slave piston is hydraulically coupled to a plurality of fluid chambers and wherein a noncompressible fluid in each chamber is selectively exhausted therefrom into a cylinder containing said piston to displace said piston in accordance with the combined volumes of fluid displaced, a fluid displacement adder unit comprising a first cavity member having an open concave surface therein, a second cavity member arranged in close adjustable spaced relation opposite said first cavity member, said second cavity member having an open concave surface therein substantially corresponding to the concave surface in said first cavity member, said surfaces being disposed to form a fluid chamber therebetween, a flexible fluid pressure transmitting diaphragm interposed between said concave surfaces and extending beyond the perimeter thereof, means for passing hydraulic fluid to and from said chamber from both sides of said diaphragm one side being hydraulically coupled to said slave piston, said diaphragm being free to flex to both said surfaces of said chamber to displace fluid therefrom, means for independently adjusting said spaced relation to precisely determine the displacement of said diaphragm to regulate the positioning of said slave piston, said diaphragm being sufficiently resilient in that portion extending beyond the perimeter of said concave surfaces to provide a seal for said chamber while allowing adjustments to be made in said spaced relation.

11. A fluid displacement adder unit as defined in claim 10 further comprising an adjustable fluid orifice to regulate the rate of displacement of fluid from said chamber during the last stage thereof to provide controlled damping of the movement of said slave piston.

12. A fluid displacement adder unit as defined in claim 10 further comprising a plurality of adjustable fluid orifices to regulate the rate of displacement of fluid from said chamber during several stages thereof to provide controlled rates of change in the movement of said slave piston during the positioning thereof.

13. A volume adder comprising a plurality of cavity members having an open concave surface therein, a block member supporting said cavity members, a closure member arranged opposite each of said surfaces and disposed in close adjustable spaced relation thereto to form a fluid chamber between each said closure member and an associated one of said surfaces, means associated with each closure member for independently adjusting said spaced relation of each chamber to precisely determine the volume thereof, a resilient pressure transmitting diaphragm interposed between each of said cavity members and its associated closure member to provide a resilient sealing portion around each said chamber, said sealing portion being disposed to extend beyond the perimeter of each said surface to permit adjustments in said spaced relation, each of said diaphragms being free to distort to the walls of their associated chambers to displace fluid therefrom, a cylinder having a displaceable piston therein, manifold means coupling said cylinder to all said chambers for exhausting hydraulic fluid from each of said chambers into said cylinder to drive said piston, and means for supplying fluid under pressure selectively to various combinations of said chambers to displace said diaphragms therein, whereby said piston is positioned within said cylinder in accordance with the combined volumes of fluid displaced by the selected diaphragms.

14. A volume adder comprising a plurality of first members having an open concavity therein, a block member supporting said first members, a closure member arranged opposite each of said concavities in face to face relation and disposed in close adjustable spaced relation thereto to form a fluid chamber between each said closure member and an associated one of said concavities, means for adjusting said spaced relation to precisely determine the volume of said chambers, a pressure transmitting diaphragm interposed between each of said first members and their associated closure members, each of said diaphragms being free to distort to both the inner contour of its associated closure member and into the concavity of its associated first member, each of said diaphragms including a resilient portion disposed beyond the perimeter of each said concavity to permit adjustments in said spaced relation, a cylinder hydraulically coupled to all said chambers, said cylinder having a displaceable piston therein, manifold means coupling said cylinder to all said chambers for exhausting fluid from said chambers into said cylinder, means for selectively displacing various combinations of said diaphragms to exhaust fluid from their associated chambers into said cylinder whereby said piston is driven in accordance with the combined volumes of fluid so displaced.

15. A fluid displacement device comprising an expansible fluid coupling containing a non-compressible fluid, a flexible diaphragm and a slave piston defining the end boundaries of said coupling, a first and second cavity member disposed in opposed adjustable spaced relation to each other to limit the displacement of said diaphragm therebetween, said diaphragm being positioned to have a stroke defined by the displacement thereof between said first and second members to transmit motion of said diaphragm through said fluid to said piston to move said piston a predetermined distance in accordance with adjustments in said spaced relation, and a plurality of holes in at least one of said cavity members for passing fluid therethrough into said coupling, said holes being so distributed and arranged so as to be progressively closed by said diaphragm as it approaches the end of its said stroke whereby the rate of fluid flow from said chamber is gradually reduced as said diaphragm is displaced.

References Cited in the file of this patent

UNITED STATES PATENTS

| | | |
|---|---|---|
| 1,821,787 | Black | Sept. 1, 1931 |
| 1,878,234 | Goodman | Sept. 20, 1932 |
| 2,111,930 | Hinckley | Mar. 22, 1938 |
| 2,317,594 | Ericson | Apr. 27, 1943 |
| 2,383,554 | Krickler | Aug. 28, 1945 |
| 2,421,866 | Benzel | June 10, 1947 |
| 2,592,221 | Whitted | Apr. 8, 1952 |
| 2,628,486 | Huff | Feb. 17, 1953 |
| 2,698,516 | Hjulian et al. | Jan. 4, 1955 |
| 2,839,002 | Williams | June 17, 1958 |
| 2,847,827 | Johnson | Aug. 19, 1958 |

FOREIGN PATENTS

| | | |
|---|---|---|
| 1,173,712 | France | Oct. 27, 1958 |